(12) United States Patent
Fields (10) Patent No.: US 9,961,175 B2
(45) Date of Patent: May 1, 2018

(54) SMART DEVICE CASE WITH SOUND SPEAKER

(71) Applicant: Ty Fields, Truckee, CA (US)

(72) Inventor: Ty Fields, Truckee, CA (US)

(*) Notice: Subject to any disclaimer, the term of this patent is extended or adjusted under 35 U.S.C. 154(b) by 456 days.

(21) Appl. No.: 14/805,879

(22) Filed: Jul. 22, 2015

(65) Prior Publication Data

US 2016/0182697 A1    Jun. 23, 2016

Related U.S. Application Data

(63) Continuation of application No. PCT/US2014/000222, filed on Dec. 18, 2014.

(51) Int. Cl.
| | | |
|---|---|---|
| *G10K 11/08* | (2006.01) | |
| *H04M 1/03* | (2006.01) | |
| *H04R 1/02* | (2006.01) | |
| *H04R 5/02* | (2006.01) | |

(52) U.S. Cl.
CPC ............ *H04M 1/035* (2013.01); *G10K 11/08* (2013.01); *H04R 1/025* (2013.01); *H04R 5/02* (2013.01); *H04R 2420/07* (2013.01)

(58) Field of Classification Search
CPC ....... H04M 1/035; G10K 11/08; H04R 1/025; H04R 5/02; H04R 2420/07
USPC ................................................ 181/157, 178
See application file for complete search history.

(56) References Cited

U.S. PATENT DOCUMENTS

| | | | |
|---|---|---|---|
| 1,029,502 A | 6/1912 | Landon | |
| 2,012,538 A | 8/1935 | Krohn | |
| 5,967,875 A | 10/1999 | Graef | |
| 7,663,878 B2* | 2/2010 | Swan | G06F 1/1632 361/679.3 |
| 7,984,842 B2 | 7/2011 | Richie | |
| 8,256,568 B2 | 9/2012 | Lin | |
| 8,320,597 B2* | 11/2012 | Griffin, Jr. | H04R 1/2857 181/179 |
| 8,327,974 B1 | 12/2012 | Smith | |
| 8,366,480 B2* | 2/2013 | Neu | H04R 5/00 439/374 |
| 8,412,289 B1 | 4/2013 | Oh | |
| 8,433,377 B1* | 4/2013 | Oh | F16M 11/10 345/158 |
| 8,522,917 B1 | 9/2013 | Oh | |
| 8,596,412 B1* | 12/2013 | Jorgensen | G06F 1/1626 181/202 |
| 8,616,327 B1 | 12/2013 | Palacios | |
| RE44,942 E | 6/2014 | Lee | |

(Continued)

*Primary Examiner* — Forrest M Phillips
(74) *Attorney, Agent, or Firm* — Heisler & Associates (57) ABSTRACT

At least one speaker is provided on a tab which is held at least partially within a case. The case also holds a smart device. A slot in the case allows for the tab with at least one speaker to slide into and out of the case. The tab can slide out of the case and deployed, and the at least one speaker can emit sound from the smart device. A power source can also be provided within the tab to power the speakers. A sound signal to the speakers can be carried by a wired interconnection to the smartphone or by wireless transmission to the speaker on the tab. In one embodiment multiple smart devices with speakers according to this invention work together by transmitting a sound signal from one smart device to a speaker associated with another smart device, either directly or through the other smart device.

18 Claims, 7 Drawing Sheets

(56) References Cited

U.S. PATENT DOCUMENTS

| | | | | |
|---|---|---|---|---|
| 8,944,209 | B1* | 2/2015 | Fields | G10K 11/08 |
| | | | | 181/175 |
| 9,232,030 | B2* | 1/2016 | Freshman | H04M 1/0202 |
| 9,258,397 | B2* | 2/2016 | Lee | H04M 1/04 |
| 9,425,847 | B2* | 8/2016 | Norair | H04M 1/0254 |
| 9,685,803 | B2* | 6/2017 | Strauser | H02J 7/0044 |
| 2002/0009195 | A1* | 1/2002 | Schon | B60R 11/0241 |
| | | | | 379/454 |
| 2006/0013411 | A1* | 1/2006 | Lin | H04R 5/02 |
| | | | | 381/87 |
| 2007/0173197 | A1* | 7/2007 | Hsiung | G06F 1/1632 |
| | | | | 455/3.06 |
| 2010/0219012 | A1 | 9/2010 | Baumbach | |
| 2013/0203473 | A1* | 8/2013 | Kota | H04M 1/0202 |
| | | | | 455/575.8 |
| 2014/0069736 | A1* | 3/2014 | Freshman | H04M 1/0202 |
| | | | | 181/182 |
| 2014/0166390 | A1* | 6/2014 | Center | H04R 1/02 |
| | | | | 181/199 |

* cited by examiner

SMART DEVICE CASE WITH SOUND SPEAKER

CROSS-REFERENCE TO RELATED APPLICATIONS

This application is a continuation-in-part of International Application No. PCT/US2014/00222, filed on Dec. 18, 2014, which claims benefit of U.S. patent application Ser. No. 14/133,353, filed on Dec. 18, 2013, issued on Feb. 3, 2015 as U.S. Pat. No. 8,944,209, which claims benefit under Title 35, United States Code § 119 (e) of U.S. Provisional Application No. 61/738,514 filed on Dec. 18, 2012.

FIELD OF THE INVENTION

The following invention relates to accessories for smartphones and other smart devices, such as MP3 players and tablet computing devices. More particularly, this invention relates to accessories for smart devices which are configured to amplify sound provided by the smart device.

BACKGROUND OF THE INVENTION

Portable electronic devices which can play sound come in a variety of different configurations. With the state of the art advancing beyond removable sound storing media such as cassette tapes and CD players, to solid state or hard disk containing devices (with sound containing media in the form of digital files stores on memory within the device itself rather than upon removable media), the shapes of such devices have changed somewhat. Many such devices generally tend to have at least one dimension which is quite thin and less than twenty-five percent of the extent of the other dimensions. Such devices typically are orthorhombic in shape with three pairs of opposing parallel sides. A thinest dimension generally extends between a front and a back of such a device. A four sided perimeter edge is presented between the front and back which is quite thin with two shorter sides referred to as ends and two longer sides referred to as lateral sides.

Examples of such electronic sound playing devices include MP3 players (e.g. iPods from Apple, Inc.) and smartphones (e.g. iPhones from Apple, Inc.), as well as tablet devices (e.g. iPads from Apple, Inc.). Collectively, such devices are referred to herein as "smart devices" for convenience. While the dimensions of such devices vary, they still generally have this orthorhombic shape with a thinnest dimension between a front and a back.

When such devices are playing sound, the sound can be enjoyed generally in two ways. First, a headphone jack is typically provided to which headphones or earbuds can be attached for sound enjoyment. Secondarily, such devices typically have a speaker from which sound can emanate to fill a space adjacent the device. This speaker is typically provided on the lower end of the device.

Generally, the speakers on such devices are deficient in at least two ways. First, because the power of such devices is limited to what can be stored on a battery contained therein, the amount of sound amplification is limited. Second, because the speakers do not have a geometry optimized for high quality sound, the sound tends to have a low quality and volume.

A variety of ad hoc solutions to this problem are known in the prior art. For instance, it is known to merely place a smartphone within a bowl and to have improved sound emanate therefrom, improved in both volume and tonal quality. However, such a solution is only useful when a bowl is available for such use, as it is not convenient to carry a bowl with the sound generating device for sound amplification. Accordingly, a need exists for a sound amplifier for a smart device which can conveniently be carried with the device itself and to be readily deployed and re-collapsed when when desired.

SUMMARY OF THE INVENTION

With this invention a sound amplifier is provided for a smart device. In a preferred embodiment a sound amplifier is configured to be attachable to a case and deployed out of the case for use in amplifying sound, or collapsed and stored within the case when not in use. The case is configured to hold the smart device therein. The case has side walls extending up from a floor to a rim. Dimensions of the case are such that the smart device fits snugly inside the case. Typically, the case is formed of a somewhat resilient material to cause the case to securely hold to the smart device. An insert structure is provided which in a preferred embodiment includes a tab and a sound amplifying cone.

In this embodiment the tab remains at least partially within the case while the cone can slide through a slot out of the case and pivot about a hinge between the cone and the tab. The cone has a tapering form between a port adjacent the smart device within the case and an outlet opposite the port. Sound is thus amplified as it passes through the cone.

The cone is configured to have a deployed form and a collapsed form. In one embodiment the cone has front and rear panels which are adjacent each other when the cone is in the collapsed form but spaced from each other when the cone is in the deployed form. Side panels join the front and rear panels together with the side panels preferably collapsible by having a crease down a middle thereof so that the side panels can transition between a folded over form bringing the front and rear panels together and an extended form where the side panels space the front and rear panels away from each other.

The case is sized sufficiently large so that the tab and cone of the insert can slide through the slot in the case and entirely into the case above the floor and still provide room within the case for the smart device.

Auxiliary speakers can optionally be provided, such as within the tab to add further sound amplification to sound from the smart device. A battery is optionally provided within the tab or elsewhere associated with the case. Wiring and electronic circuitry is provided between the battery and the speakers so that the speakers can be powered. A signal can be provided to the speakers either through a wire or wirelessly, such as through use of the Bluetooth wireless transmission protocol, by transmission from the smart device to a receiver within the circuitry associated with the battery and speakers. A power port is also optionally provided for recharging of the battery associated with the amplifier.

In a further embodiment the sound amplification cone is optional and the tab is fitted with at least one speaker, and in some embodiments multiple speakers. The tab is configured to be longer than the cone supporting tab of the previous embodiment, up to a length similar to an entire length of the slot. A top surface of the tab has at least one speaker coupled thereto. The tab has a distal end opposite a proximal end with the distal end including ears which remain outside of the slot, and with the proximal end remaining inside the slot. The speaker (or speakers) can be wired to the smart device, such a through an interconnection to supply a sound signal and/or power to the speakers. The tab can also include an auxiliary battery thereon and optionally a signal receiver so that the speakers can optionally be driven by a wireless sound signal sent from the smart device (or some other source such as another smart device) and with the speakers driven by power from the auxiliary battery. When the tab is slid to a stored position the speakers are covered and protected, such as when the speakers are not in use. A switch can be provided to automatically turn the speakers on and off depending on whether the tab is in the stored position or the deployed position, with the switch turning to the on position when the tab moves to the deployed position.

In one embodiment multiple smart devices in similar cases according to this invention can work together. In particular, at least one of the smart devices acts as a source which has a sound file able to be played thereon. This source smart device includes a transmitter, preferably within the case, but also conceivably built into the smartphone itself (e.g. a Bluetooth transceiver). Not only can this sound signal transmitter transmit a sound signal to the speakers on the tab of the case associated with that smartphone, but can also send a signal to speakers on tabs of cases housing other smart devices, or transmit a signal to other smart devices, which is then relayed to the speakers associated with those other smart devices. In one embodiment only portions of the signal are transmitted, such as a left or right channel of a stereo sound signal.

In other variations more than two (and potentially an unlimited number of other) smart devices with appropriate receivers can receive signals from the smart device having the source sound signal, to form a telecommunications connection with the source smart device, receive at least a portion of the sound signal and play at least a portion of the sound signal from each of the smart devices so interconnected. In one embodiment public address systems and other sound systems of small, medium, large and even exceptionally large buildings and stadiums could have their public address systems and other sound systems replaced or augmented by each individual therein or small groups of individuals therein having a smart device with case and speakers receiving a wireless signal from the source smart device, which could have sound input from a microphone from the public address system or other sound system coupled to the source smart device.

Where distances are too great for transmission ranges of the individual smart devices, intermediate smart devices can function not only as sound signal receivers but also as sound signal re-transmitters so that any smart device within transmission range of another smart device can connect into the wireless sound network. In one embodiment such a wireless smartphone sound network can address the problem of sound in public address systems of large stadiums and auditoriums reaching different individuals at different times and producing undesirable distortion of the sound.

OBJECTS OF THE INVENTION

Accordingly, a primary object of the present invention is to provide a sound amplifier for a smart device which has a hollow tapering form to provide natural sound amplification.

Another object of the present invention is to provide a sound amplifier for a smart device which can fit within a case of the smart device and be stored in a collapsed form inside the case or deployed out of the case for use in amplifying sound.

Another object of the present invention is to provide a sound amplification method to amplify sound from a smart device to improve enjoyment of sound from the smart device.

Another object of the present invention is to provide an amplifier for a smart device which is easy to attach to a smart device and which is readily configurable between a deployed form and a collapsed form.

Another object of the present invention is to provide a smart device sound amplifier which can be provided in various different sizes to work with smart devices of different types.

Another object of the present invention is to provide a smart device case with at least one sound speaker therein to augment an amount of sound outputted from the smart device.

Another object of the present invention is to provide a method and system for interconnecting speakers associated with different smart devices in a wireless fashion to provide a wireless sound network with multiple distributed speakers each receiving at least a portion of a sound signal from a source smart device within the network.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 is directed to an assembly for providing sound amplification for a smart device S (FIG. 4) according to a preferred embodiment of this invention. In this embodiment, the assembly 10 includes a case 20 for the smart device S, such as a smartphone, as well as an insert 40 deployable out of the case 20, so that the insert 40 can be reconfigured between a collapsed form and a deployed form. The insert 40 includes a sound amplification cone 70 which can be placed adjacent speakers of the smart device S to amplify sound from the smart device S.

Figure 4:
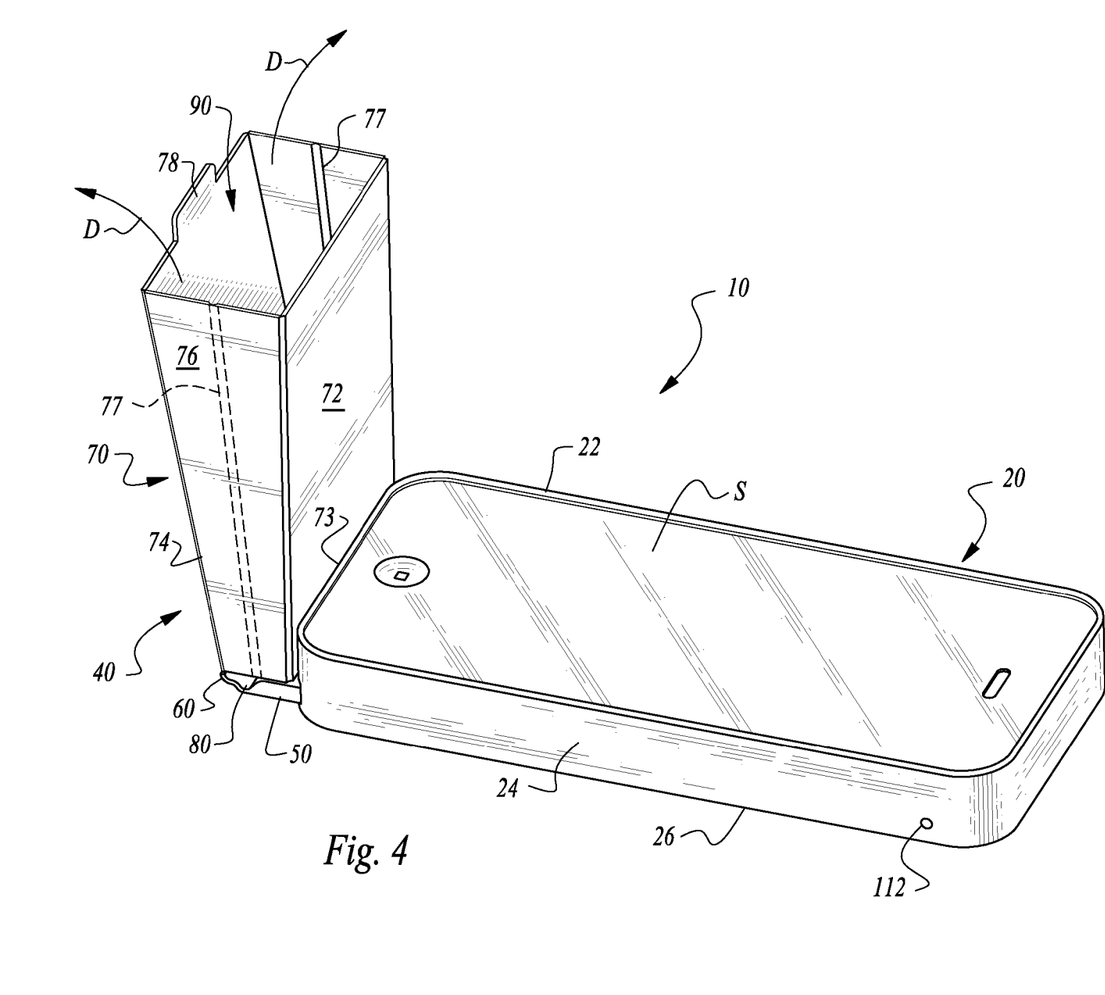
FIG. 4 is a perspective view similar to that which is shown in FIG. 3 but after rotation of the sound amplification cone to one final use position adjacent to an end of the smart device and case, for amplifying sound emanating from the smart device, and with a smartphone shown installed within the case portion of the assembly.

In essence, and with particular reference to FIG. 4, basic details of the assembly 10 are described, according to this preferred embodiment. The assembly 10 includes the case 20 for a smart device S and the insert 40 movable relative to the case 20 and storable within the case 20. The case 20 is sized to hold a smart device S therein, such as a smartphone. The insert 40 includes a tab 50 hinged through a hinge 60 to a sound amplification cone 70. When in a collapsed form, the tab 50 and cone 70 lie flat and can sit within a portion of the case 20 along with the smart device S. The cone 70 can be reconfigured between a collapsed form and a deployed form. When deployed, the cone 70 extends between a port 80 and an outlet 90. The port 80 can be placed adjacent speakers of the smart device S for sound to be inputted into the sound amplification cone 70. The outlet 90 is larger than the port 80 and thus emits amplified sound out of the sound amplification cone 70.

Additionally, speakers 100 (FIGS. 3 and 5) can be provided within the tab 50 or otherwise within some portion of the insert 40 to add further sound into the sound amplification cone 70. These speakers 100 can be coupled to circuitry including a battery 110 to supply power to the speakers 100, and can also receive a signal either through a wire coupled to the smart device S or through a wireless transmission such as utilizing a wireless radio transmission protocol (e.g. bluetooth) to provide an audio signal to the speakers 100 from the smart device S. Optionally, a second battery 120 can also be provided within the case 20 (FIG. 5) to provide further power for the speakers 100 or to otherwise provide additional power for powering the smart device S.

Figure 1:
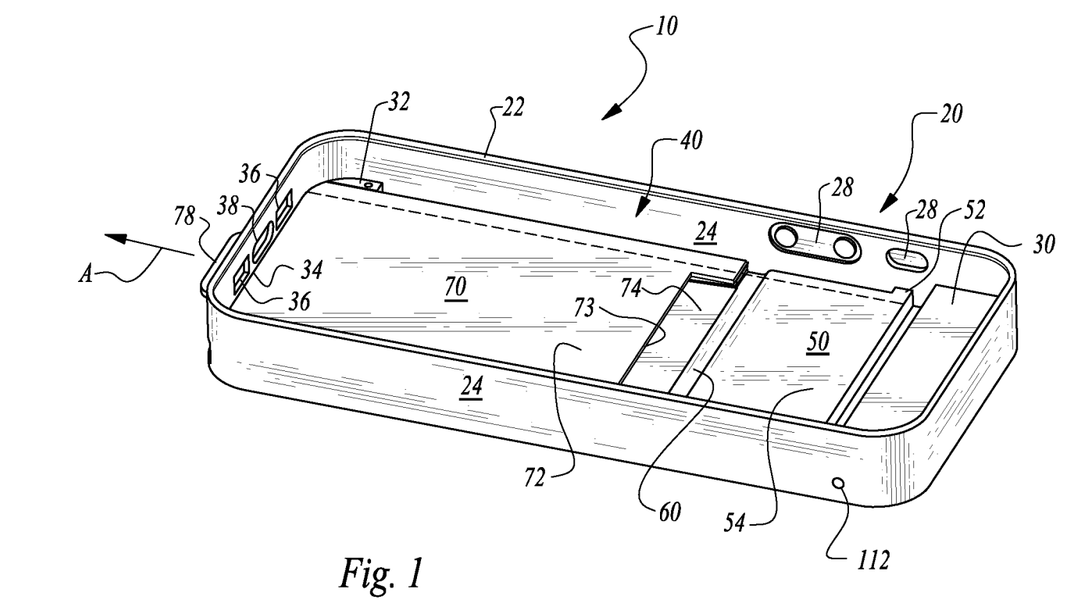
FIG. 1 is a perspective view of a sound amplifier assembly of this invention including a case and an insert within the case which includes a sound amplifying cone, with the sound amplifying cone shown stored within the case.
Figure 2:
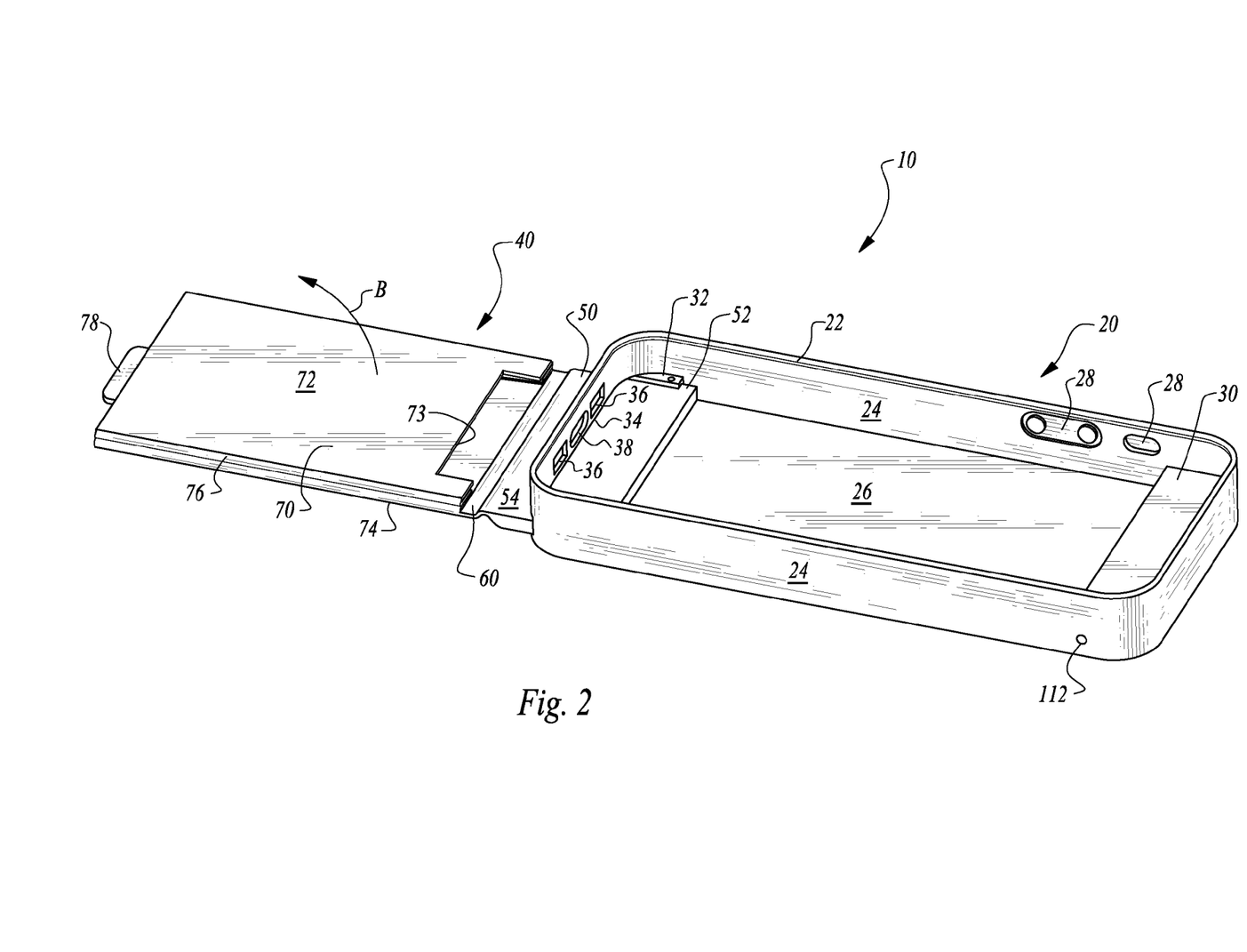
FIG. 2 is a perspective view similar to FIG. 1 but after an insert of the assembly including a sound amplifying cone and tab have been extended out of a slot in the case, ready for deployment of the sound amplifying cone.

More specifically, and with particular reference to FIGS. 1 and 2, details of the case 20 of the assembly 10 are described, according to this preferred embodiment. The case 20 is similar to many prior art smart device cases except that it is deeper to accommodate storage of the insert 40 when in a collapsed orientation. This added depth is approximately thirty to forty percent of the height of the case 20. The case 20 includes sides 24 extending perpendicularly up from a floor 26 to a rim 22. The sides 24 include long lateral sides and short end sides so that lateral end sides of the smart device are covered by the sides 24 of the case 20.

The rim 22 typically has a small lip extending inwardly to help secure the case 20 upon the smart device. A face of the smart device is accessible inboard of this rim 22. In some instances, a protective layer over the face of the smart device is associated with the case 20 and spanning between the rims 22 of the sides 24. Other details common with many smartphone cases 20 include control ports 28 so that buttons on a side of the smart device S can be accessed through the case 20.

Furthermore, sound ports 36 and a connection port 38 are typically provided at one of the ends of the case 20, generally aligned with speakers of the smart device S, and a connection interface of the smart device S. The connection interface allows for interconnection of various devices to the smart device and specifically also acts as a recharging port and data transfer port. The case 20 is typically formed of a somewhat resilient material so that it protects the smart device somewhat from shocks and also can stretch somewhat to snap onto the smart device S and be held securely to the smart device S.

Because the insert 40 is typically not as long as a longest dimension of the smart device, a shelf 30 is provided at an end of the case 20 opposite the sound ports 36 and communication port 38. A second battery 120 can optionally be provided inside of this shelf 30. Also, a power port 112 can pass through the case 20 and access space within this shelf 30 such as to supply power to this second battery 120 and so that battery power within the case 20 itself can be maintained. In one embodiment this second battery 120 is configured to be coupleable to a battery within the smart device, such as through the connection port 38 by placing appropriate wiring inboard of the case 20 or by running a power cord from the power port 112 to the connection port 38. In this way, additional power, such as emergency backup power, can be provided within the case 20 to provide power to the smart device S should it be running low on power.

The end side of the case 20 having the sound ports 36 and connection port 38 therein preferably also includes a slot 34 located adjacent the floor 26. This slot 34 is substantially as wide as the entire case 20 and has a height slightly less than half of a height of the case 20. This slot 34 allows for sliding of the insert 40 out of the case 20 and back into the case 20. A height of this slot 34 is similar to a height of the insert 40 when in its collapsed form.

A stop 32 is provided adjacent this slot 34. Preferably, this stop 32 includes two separate halves on lateral sides of the slot 34 and adjacent the sides 24 of the case 20. This stop 32 interacts with the tab 50 of the insert 40 to keep the tab 50 at least partially within the case 20 when the insert 40 is deployed (along arrow A of FIG. 1) out of the case 20. This stop 32 is only provided within a lower portion of the case 20 so that the smart device can overlie this stop 32. The stop 32 thus also acts along with the shelf 30 to keep the smart device S from inadvertently extending down into lower portions of the case 20 and interfering with sliding of the insert 40 back into the case 20. While only one stop 32 is shown and one side of the slot 34 because of the perspective of FIGS. 1 and 2, it is understood that a second similar stop 32 is provided on a near side of FIGS. 1 and 2 that is a mirror image of the stop 32 shown in FIGS. 1 and 2.

While the case 20 is shown with a particular configuration described herein, the case 20 would be altered to accommodate dimensions of different smart devices from the same or different manufacturers and could also be modified to accommodate different input and output buttons and other structures associated with the smart device and still function effectively according to this invention. While the smart device is shown as a smartphone S (FIG. 4) other smart devices including MP3 players and tablet computing devices could similarly be accommodated by this invention by having dimensions appropriately adjusted. While the slot 34 is shown in a smallest end side of the case 20, it is conceivable that the slot 34 could be in one of the longer sides 24 of the case 20 and still function according to this invention.

With particular reference to FIGS. 2-5, details of the insert 40 that can slide into and out of the case 20 are described according to this preferred embodiment. The insert 40 includes the tab 50 and sound amplification cone 70 hinged together by the hinge 60. This insert 40 is a separate structure from the case 20 but fits within the case 20 when in a stored position and is captured to the case 20 sufficiently so that the insert 40 is typically never entirely removed from the case 20.

The tab 50 defines a portion of the insert 40 which remains at least partially within the case 20 and secures the insert 40 to the case 20. This tab 50 has a thickness similar to that of the sound amplification cone 70 when in its collapsed form. The tab 50 has a width similar to a width of the smart device S and smartphone case 20, similar to a width of the slot 34 in the case 20. The tab 50 includes a post 52 extending laterally from each side thereof (with only one of the posts 52 shown due to the perspective provided in FIGS. 1-3). This post 52 and the tab 50 defines a wider portion of the tab 50 which cannot fit out of the slot 34, but rather abuts the stop 32 within the case 20 to keep the tab 50 from sliding entirely out of the case 20 (along arrow A of FIG. 1). As an alternative to the stop 32, the posts 52 could merely abut against portions of an end side of the case 20 provided by the slot 34 being as wide as all portions of the tab 50 except for the posts 52, so that the posts 52 cannot fit through the slot 34.

If desired, a small step or detent in the width of the tab can be provided at a midpoint thereof to allow the tab 50 to be either mostly slid out of the slot 34 or only partially slid out of the slot. If only partially slid out, the cone 70 has its inlet port 80 end directly adjacent the case 20.

A top surface 54 of the tab 50 faces upward and has at least a portion thereof located outside of the case 20 when the tab 50 has been slid out of the case 20 (FIG. 2). This tab 50 can optionally be fitted with speakers 100 (FIGS. 3 and 5) and can optionally be fitted with a battery 110 contained therein. Such speakers 100 would typically be provided as a pair in lateral sides of the tab 50 and on portions of the tab 50 which extend out of the case 20. These portions of the tab 50 are located adjacent the port 80 of the sound amplification cone 70 when the sound amplification cone 70 has been converted into its deployed form (along arrow B of FIG. 2) and rotated up into its final position (along arrow C of FIG. 3). Thus, sound from the speakers 100 can be amplified through the sound amplification cone 70 and be emitted out of the outlet 90 (along arrow D of FIG. 4).

In one embodiment, the tab 50 includes circuitry associated with the battery 110 and speakers 100 which also includes a receiver for receiving a sound signal from the smart device S (such as utilizing a Bluetooth transmission protocol) so that no wires are required extending between the tab 50 and the smart device S, but still allowing for sound from a smart device S to be played from the speakers 100. In one embodiment, the battery 110 and the tab 50 can be charged by having a plug which interfaces with the shelf 30 within the case 20 when the insert 40 is collapsed and stored within the case 20 by having the closest portion of the tab 50 abut the shelf 30 and close an electrical connection so that power can be transferred directly between the second battery 120 within the shelf 30 and the battery 110 within the tab 50 whenever the tab 50 is stored fully inside the case 20. As another alternative, a separate power port can be provided similar to the power port 110, but within the tab 50 for charging of the battery 110. Such charging can be from or to the smart device S by a power cord or from regular electric service at a wall outlet or other power outlet.

The tab 50 includes a hinge 60 at an outermost edge thereof which attaches the tab 50 to the sound amplification cone 70. This hinge 60 is preferably merely a thin flexible portion of the material forming the tab 50 and cone 70, sufficiently thin and flexible to facilitate ninety degrees of rotating of the sound amplification cone 70 relative to the tab 50. In this way, rotation (along arrow C of FIG. 3) is accommodated by the hinge 60.

The sound amplification cone 70 in the preferred embodiment has a rectangular form at both a smaller port 80 and at a larger outlet 90 on opposite ends of the sound amplification cone 70. The sound amplification cone 70 includes a front panel 72 opposite a rear panel 74 with side panels 76 joining the front panel 72 to the rear panel 74. Each of these panels 72, 74, 76 extend from the port 80 to the outlet 90.

The front panel 72 preferably includes an opening 73 at an end thereof adjacent the port 80. This opening 73 is sufficiently wide so that the sound ports 36 in the end of the case 20 and aligned with speakers of the smart device S can pass directly into an interior of the sound amplification cone 70.

A grip 78 is provided at an end of the front panel 72 or rear panel 74. This grip 78 extends slightly out of the case 20 even when the entire insert 40 is in the stored position within the case 20. A user can thus grasp the grip 78 and pull the entire insert 40 laterally (along arrow A) out of the case 20 (FIG. 1). The sound amplification cone 70 can then be converted from the storage configuration to the deployed configuration by movement of the front panel 72 away from the rear panel 74 (along arrow B of FIG. 2).

The side panels 76 preferably include a crease 77 extending between the port 80 and the outlet 90. This crease 77 bisects the side panels 76 and is located between the front panel 72 and the rear panel 74. The crease 77 adds sufficient flexibility to the side panels 76 so that they can transition between a folded form where portions of each side panel adjacent the crease are parallel and adjacent each other and an unfolded form where portions of the side panels 76 on opposite sides of the crease 77 are approximately co-planar. The creases 77 flex preferably inward so that a width of the sound amplification cone 70 does not exceed a width of the slot 74 when in the collapsed orientation. A thickness of the sound amplification cone 70 when in the collapsed orientation is similar to a thickness of the front panel 72 plus the rear panel 74 plus twice the thickness of the side panels 76. This thickness is preferably similar to that of the tab 50 so that the entire insert 40 has a common thickness. This thickness is also similar to the height of the slot 34 accommodating sliding of the insert 40 into and out of the case 20.

Figure 3:
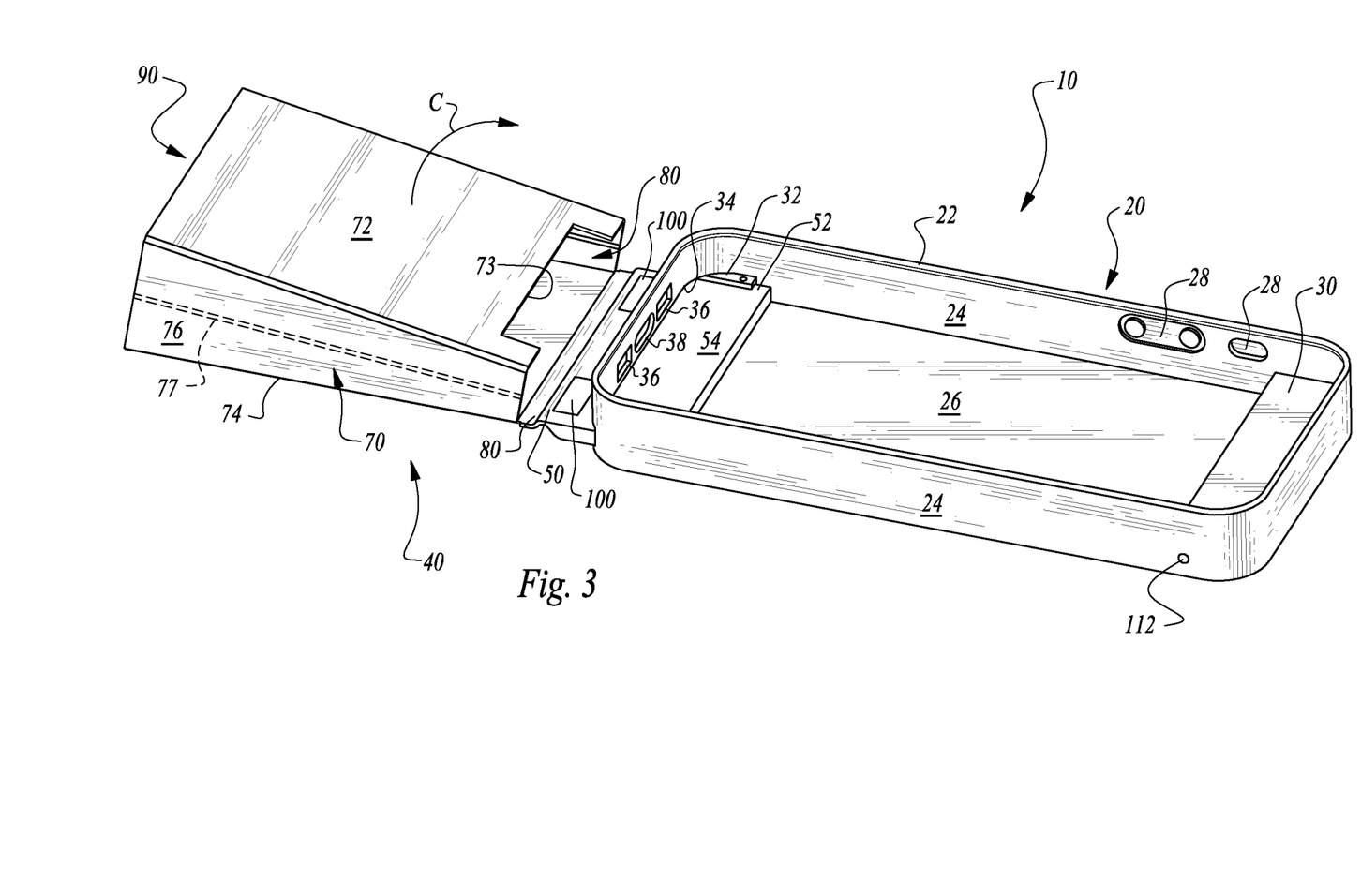
FIG. 3 is a perspective view similar to that which is shown in FIG. 2 but after the sound amplifying cone has been expanded from a collapsed form to a deployed form.
Figure 5:
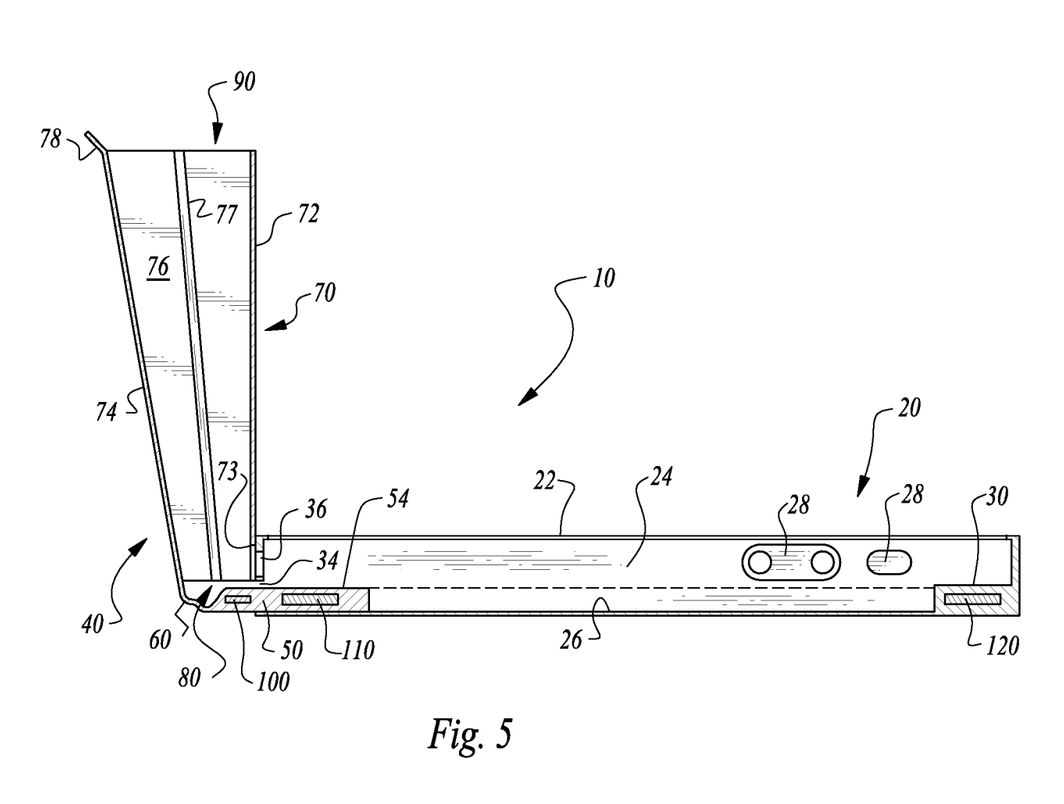
FIG. 5 is a full sectional side elevation view of that which is shown in FIG. 4, but with the smartphone removed from the case portion of the assembly.

While the primary methodology for utilizing the sound amplification cone 70 is shown in FIGS. 4 and 5 with the sound amplification cone 70 slid out of the case 20 and then expanded into its deployed form and then rotated into position adjacent an end of the smart device S within the case 20, other forms of utilization of the sound amplification cone 70 can also be employed. For instance, and as depicted in FIG. 3, the sound from the end of the smart device can merely pass into the port 80 while the sound amplification cone 70 is laying flat. If desired, the tab 50 can be slid partially into the case 20 so that the port 80 is directly adjacent the end of the case 20. If the side panels 76 are slightly folded, the entire assembly 10 including the smart device can conceivably be rotated so that the sound amplification cone 70 becomes a stand with the outlet 90 resting upon a horizontal surface with the case 20 extending up from the outlet 90 of the sound amplification cone 70. Similarly, the end of the case 20 adjacent the sound amplification cone 70 can conceivably be slid partially into the port 80 with a sufficient friction fit so that the case 20 and smart device can be held within the port 80 and the sound amplification cone 70 can act as a stand or otherwise merely remain attached to the end of the case 20 so that smart device amplification is provided within a more elongate form (FIG. 3) rather than in an angular form (FIG. 4).

While the outlet 90 is shown with edges of the panel 72, 74, 76 all coplanar, these edges could be scalloped or otherwise contoured either to provide decorative appearance or to allow for sound passage when the sound amplification cone 70 is being used as a stand for the case 20 and smart device S.

Figure 6:
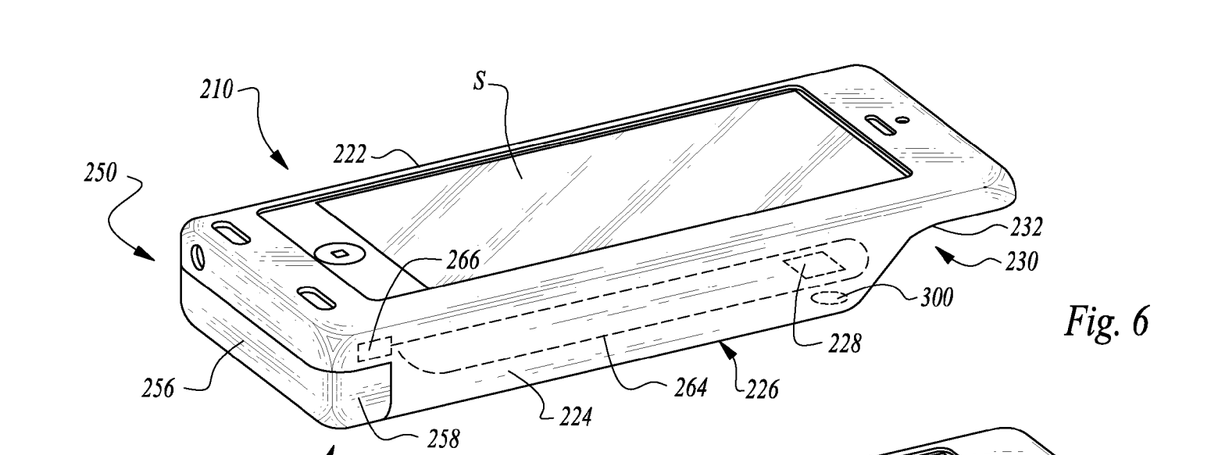
FIG. 6 is a perspective view of an alternative assembly including a case with a tab sliding into and out of a slot thereof, and with at least one speaker on the tab, the assembly shown with the tab in a stored position.
Figure 7:
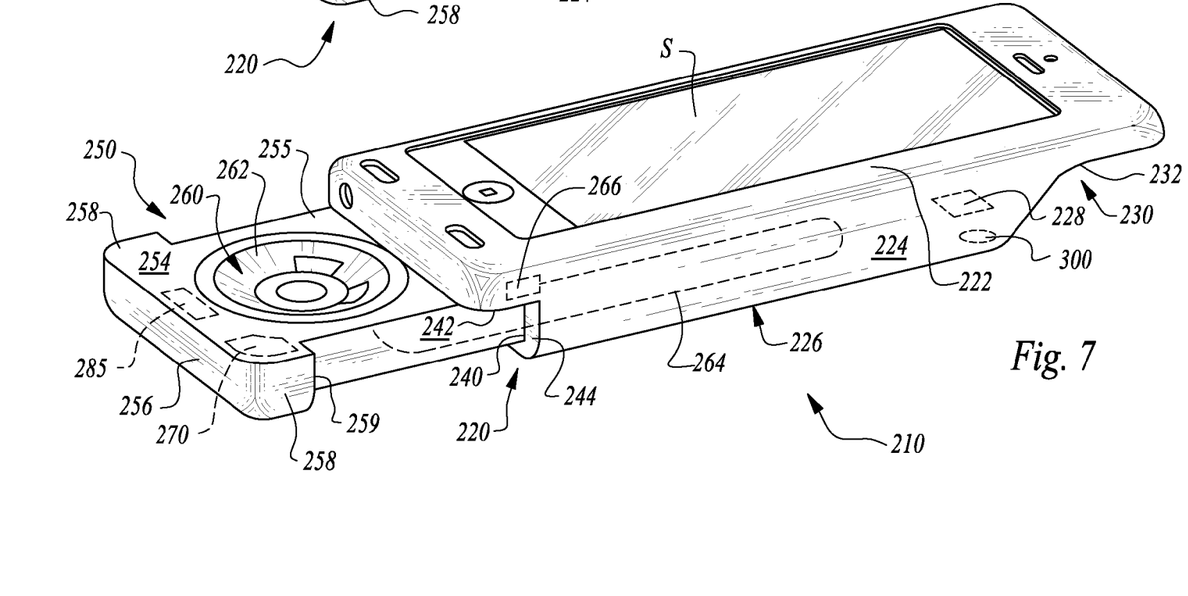
FIG. 7 is a perspective view of that which is shown in FIG. 7, but with the tab shown in an at least partially deployed configuration.

With particular reference to FIGS. 6 and 7, details of an alternative assembly 210 are described. The alternative assembly 210 is similar to the assembly 10 described above, except where specifically and distinctly described herein. The alternative assembly 210 includes an alternative case 220 which houses a smart device S therein. This alternative case 220 includes a rim 222 surrounding a touch screen on a front surface of the smart device S. Sides 224 extend down from the rim 222 to an undersurface 226 defining a lower portion of the case 220 generally parallel with and opposite the front surface of the smart device S when it is located within the case 220.

Control ports 228 are provided at various locations around a perimeter of the case 220 to allow for switches, input ports, output ports, speaker ports, camera aperture ports, and other ports of the smart device S to operate through portions of the case 220. These control ports 228 are only illustrated in one optional configuration in FIGS. 6 and 7, with these ports 228 particularly located where desired for a particular type of smart device S to be contained therein. These control ports 228 can be in the form of openable doors, sufficiently thin panels that buttons can be pushed therethrough, removable plugs, windows with and without panes therein, slots, sound emitting holes, or other ports to allow underlying portions of the smart device S to be utilized.

In the alternative assembly 210, the case 220 includes a recess 230 on one end thereof adjacent the undersurface 226 and generally opposite the location of the opening into a slot 240 and the location of a tab 250. This recess 230 includes a sloping undersurface 232 which transitions between the undersurface 226 of the case 220 and the end of the case 220 opposite the opening of the slot 240 and tab 250. The recess 230 and sloping undersurface 232 are preferably provided so that elements such as a camera aperture associated with the smart device S do not need to pass entirely through a full thickness of the case 220, but has a thinner amount of thickness at this end. As an alternative, this space could be filled with an auxiliary battery or a storage compartment. It is also conceivable that the slot 240 and tab 250 could be made longer to use up this recess 230 space.

The slot 240 preferably takes up a lower portion of the case 220 from the recess 230 to the end of the case 220 opposite the recess 230. This slot 240 defines a lower portion of the case 220 beneath the smart device S. In one embodiment a panel can be provided fully dividing the slot 240 from the chamber in which the smart device S is located. In another embodiment, and as disclosed above, a single chamber is provided which provides room for both the slot 240 (below) and room for the smart device S (above) within the case 220 and in a common chamber. Details of the slot 240 are generally similar to those described above with the assembly 10 and case 20.

An open end of the slot 240 located opposite the recess 230 is preferably configured with an overhang 242 on upper portions of the case 220 and a wall 244 perpendicular to the overhang 242 and defining a surface into which the opening of the slot 240 extends. The overhang 242 and wall 244 preferably are sized similar to ears 258 at a distal end 256 of the tab 250 so that the tab 250 has a flush appearance with the case 220 when the tab 250 is placed in a stored position.

The tab 250 defines a sliding structure which slides into and out of the slot 240. The tab 250 includes a proximal end 255 opposite the distal end 256. This proximal end 255 extends deep into the slot 240 when the tab 250 is in the stored position, and the proximal end 255 comes almost all of the way out of the slot 240 when the tab 250 is in a deployed position. Details of the proximal end 255 of the tab 250 can be configured similar to details of the tab 50 associated with the case 20 of the assembly 10.

The tab 250 includes a top surface 254 extending from the distal end 256 to the proximal end 255. This top surface has the speakers 260 extending therethrough, with the speakers 260 preferably recessed into this top surface 254 so that cones 262 of the speakers 260 form small recesses into the top surface 254 and so that a perimeter of each cone 262 is generally flush with the top surface 254.

The ears 258 extend laterally from each lateral side of the distal end 256. Each ear 258 has a face 259 facing back toward the wall 244 adjacent the opening in the slot 240. The face 259 is oriented so that it can be brought flush with the wall 244 when the tab 250 is placed in the stored position, so that the presence of the tab 250 is largely concealed when it is in the stored position. The ears 258 provide a convenient location for grasping the tab 250 to cause it to slide out of the slot 240. If desired, the ears 258 could extend slightly further laterally than the sides 224 of the case 220 so that the ears 258 would be even easier to grasp.

The tab 250 preferably includes wiring 264 extending from the speakers 260 to an interconnection 266 within the case 220 where electrical interconnection can be made with the smartphone S, such as into one of the ports of the smartphone S. Such a wired connection between the speakers 260 and the smartphone S provide merely one option for providing power and a sound signal to the speaker 260. As an alternative, a signal receiver 285 can be placed on the tab 250 (or elsewhere on the case 220) and then signal wiring can extend from the signal receiver 285 to the speaker 260. An auxiliary battery 270 can be provided in the tab 250 to supply power to the speaker 260 either for a wired or wireless transmission embodiment of this invention. Other necessary electronics for driving the speaker 260, such as an amplifier, signal conditioning, voltage regulation, and other electric circuit details can be provided within in the tab 250 or elsewhere in the case 220.

Figures 8, 9:
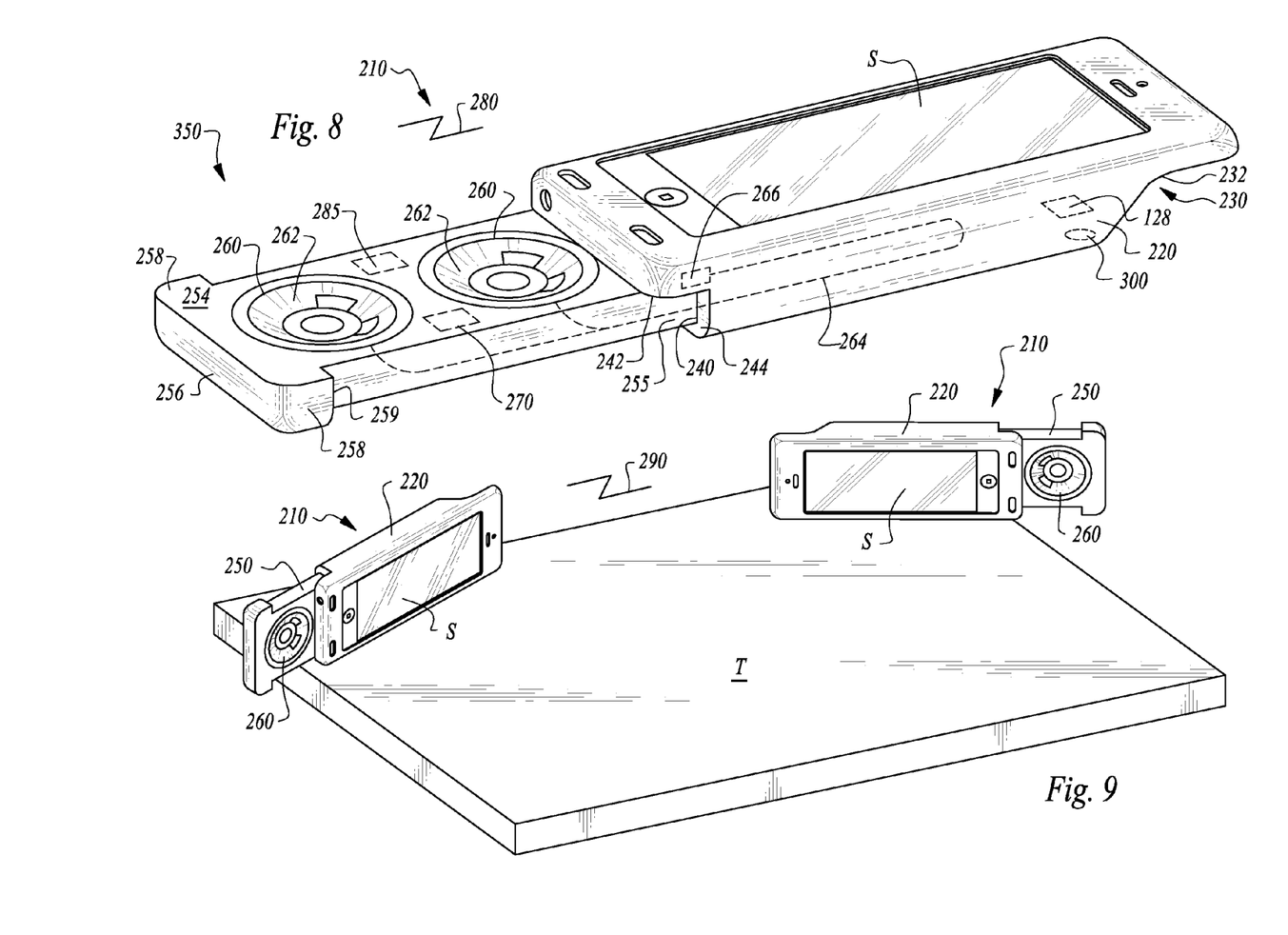
FIG. 8 is a perspective view of an alternative assembly which includes two speakers on the tab thereof.
FIG. 9 is a perspective view of an embodiment of this invention where multiple smartphones have similar cases with speakers therein and a sound signal is transmitted from one smart device either to the other smart device or to the speakers associated with the other smart device, so that multiple speakers associated with separate cases and separate smart devices can carry portions of a common sound signal as part of a wireless speaker network.

With particular reference to FIG. 8, an assembly 210 featuring a double speaker tab 350 is shown. This embodiment of FIG. 8 is similar to that of FIGS. 6 and 7 except that two speakers 260 are provided on the tab 350, instead of just one speaker 260. One of the two speakers 260 is located closer to the distal end 256 and one of the two speakers 260 is located closer to the proximal end 255.

A switch 300 is preferably located within the case 220 deep within the slot 240 which detects whether the tab 250 is fully within the stored position or whether it is at least partially deployed. This switch 300 can be interconnected with the smart phone S and/or circuitry associated with the speakers 260 so that the speakers 260 are automatically powered off when the tab 250 is placed into the stored position. As an alternative to having the switch 300 deep within the slot 240 to detect full stored position location of the tab 250, the switch 300 could be placed along a side of the slot 240 so that the power off condition caused by the switch 300 would only occur when the tab 250 is approaching the stored position, but not necessarily entirely within the stored position. The switch 300 is preferably merely a contact switch which provides a signal (or opens or closes a circuit) upon contact with the proximal end 255 or other portion of the tab 250 within the slot 240.

With particular reference to FIG. 9, one implementation of the alternative assembly 210 of this invention is disclosed. While the speaker 260 of each case 220 can receive a wireless sound signal through a sound receiver 285 on each tab 250, in one embodiment the signal receiver 285 can also receive a signal from some other smart device S associated with a separate case 220 and separate speaker 260. In particular, wireless interconnection 280 can occur between two smart devices S within separate cases 220, or between one smart device S within one case 220 and a speaker 260 of a case 220 associated with the other smart device S. Whether the signal is transmitted by wireless interconnection 290 directly to the speakers 260 of another case 220 or the signal is transmitted between smart devices and then to associated speakers 260, the opportunity exists for multiple speakers to emit sound from a common sound file.

In one embodiment the speakers receive a common signal and play a common sound. In another embodiment a source signal is broken into subcomponents, such as the left and right channels of a stereo signal and either only one of these components of the source signal is transmitted or both sound signals are transmitted and the signal receiver 285 or the smart device S associated with the separate speaker 260 can select which portion of the sound signal (such as selection of the left channel or the right channel of a stereo signal) is to be emitted by the speaker 260.

While two smart devices S and associated cases 220 and speakers 260 are shown, a potentially unlimited number of smart devices S and cases 220 with associated speakers 260 could be coupled together in this fashion. If distances greater than transmission range for the source smart device S are involved, each smart device S and/or signal receivers 285 associated with speakers 260 could function as relays to not only receive a signal from the source smart device, but retransmit the signal to other adjacent smart devices S with cases 220 and speakers 260 compatible with the overall network. In this way, any smart device with a case 220 and speaker 260 or compatible equipment which is within the range of at least one other smart device, case and speaker, can receive the signal and emit sound associated with at least a portion of the source sound signal.

Systems enabled by such interconnection of speakers carrying a common signal include the ability to provide personalized sound emission for individual users, such as for hearing impaired individuals who need extra sound amplification, or to replace or augment sound systems and public address systems in both small and large auditoriums and even arenas. Utilization of such a network has the potential to allow for sound systems and other public address systems to be deployed in a temporary fashion, such as for an impromptu outdoor music festival or concert, provided that the source sound signal is inputted into the first smart device, such as through a sound microphone coupled to the source sound signal smart device S.

Other variations on the case 20 of this invention are further disclosed as follows. While the case 20 has been described above in various embodiments primarily directed to a smart device S in the form of a generally pocket sized or hand-held smart device S, the cases of various embodiments of this invention could be further modified to match the geometry of other portable electronic devices including laptop computers. Laptop computers typically have a hinge with a screen on a panel on one side of the hinge and a base with a keyboard on an opposite side of the hinge. Various electronics within the laptop computer can be contained on either side of the hinge, but generally are concentrated on the base side of the hinge. The case of this invention could be modified to support at least one portion of the laptop on one side of the hinge, and most typically the base portion.

The case would be provided with a depth greater than that of the base of the laptop and have a lower compartment into which elements of this invention can be slidably received. For instance, speakers could be contained within this compartment and slide out when desired to provide greater and/or higher quality sound associated with the laptop. A sound amplification cone could also be provided, either for use with the speakers of the case or positioned to amplify sound already emanating from the laptop.

Such a case configured to support a laptop could also alternatively include its own power supply and would typically include wiring to access ports on the laptop computer for receipt of a sound signal and/or power, and also to potentially supply microphone input from an auxiliary microphone provided on or with the case. While the case would typically be provided for the base of the laptop it could alternatively be provided to attach over the screen portion of the laptop or to include a hinge and to be provided over both the screen portion and base portion of the laptop.

While the various embodiments of this invention include an insert 40 which is pivotably attached to a tab 50 through a hinge 60, this configuration could be slightly modified in alternative embodiments so that the insert could have a movement other than sliding out of a compartment within the case, but instead to flip out or twist out. For a flipping out configuration, the compartment of the case would be open, such as on a bottom surface of the case 20 and the sound amplification cone 70 or speakers 100 on a "cone-less" embodiment would not slide out of a compartment in the case 20, but rather would be exposed by pivoting of a support structure akin to the insert from a stored position adjacent other portions of the case 20 to a deployed position, which typically involves 180° of pivoting and optionally 180° of twisting if desired, so that the sound amplification cone and/or speakers can be oriented where desired.

Furthermore, while embodiments disclosed herein generally show an insert 40 sliding out of a small end of a case 20, it is conceivable that the insert 40 could be provided to slide out of a longer side of the case 20 which would generally be from a lateral side of the smartphone S or other portable electronic device. Such a side slide could be provided for any of the embodiments disclosed above, including those for laptop computers. Furthermore, while prior embodiments have shown the insert 40 sliding out of a compartment in the case 20 from a lower end thereof, it could conceivably be reversed to slide out of a compartment at an upper end of the case 20.

While embodiments disclosed above have been primarily directed to enhanced sound output from a smart device S or other portable electronic device, the insert 40 or other support for sound output accessories could include an auxiliary microphone built thereinto, or other portions of the case could be fitted with an auxiliary microphone. This auxiliary microphone would typically be coupled to electronic wiring and an appropriate port for interfacing with the smart devices. Enhanced sound input can thus also be provided. In embodiments where multiple devices according to this invention are communicating directly with each other in a wireless fashion, such as to utilize multiple devices according to this invention as a form of portable sound system, such an auxiliary microphone within one of the devices would provide at least one input source for sound files which would then be transmitted and emanate, either after a delay or in "real time" from various different speakers associated with various different cases as part of an overall wireless network.

The case 20 of this invention and cases of various different alternative embodiments can in some embodiments be configured to be at least partially water resistant or waterproof. Such characteristics can be provided by selection of waterproof materials and by utilizing connectors which have waterproof materials and geometries. The waterproofing can protect electronics within the various different accessories contained within the case 20 or other embodiments of cases of this invention as well. Also, such water protection attributes of the case can act to some extent as waterproofing for the smart device S or other portable electronic device contained within the case. Thus, the case with water resistant or waterproof characteristics provides protection for both electronics contained within the case in some embodiments and protection for the smart device S contained within the case in other embodiments of this invention.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A smart device case with sound speaker, comprising in combination:
    a case including sides extending up from a floor to a rim, the case configured to hold a smart device therein with a front of the smart device surrounded by said rim;
    a slot in one of said sides, said slot closer to said floor than to said rim;
    a sound support tab having a width less than a width of said slot and a thickness less than a height of said slot;
    said tab having a proximal end opposite a distal end, said proximal end inside said slot, said distal end outside of said slot;
    said tab slidable between a stored position and a deployed position, with said deployed position locating said tab more out of said slot than said stored position; and
    at least one speaker on said tab, said speaker connectable to the smart device to output sound from the smart device through the speaker.

2. The case of claim 1 wherein said tab has a top surface defining a surface of said tab most distant from said floor of said slot, said top surface having said speaker adjacent thereto to emit sound out of said top surface.

3. The case of claim 2 wherein said speaker has a cone with a perimeter oriented substantially flush with said top surface of said tab.

4. The case of claim 1 wherein said at least one speaker is wired to said smart device through at least one wire passing from said tab to said smart device.

5. The case of claim 1 wherein said speaker receives a sound signal wirelessly from said smart device.

6. The case of claim 5 wherein said tab includes a signal receiver coupled to said at least one speaker, said signal receiver receiving a signal from the smart device and passing the signal to the at least one speaker.

7. The case of claim 6 wherein a battery is located on said tab, said battery supplying power to the at least one speaker.

8. The case of claim 1 wherein said tab includes ears extending from lateral sides of said distal end, said ears extending away from each other a distance similar to a width of said case, said tab having a height less than a thickness of said case with portions of said case above said top surface of said tab defining an overhang overlying said distal end of said tab, said ears of said tab having a face facing towards said proximal end of said tab, said slot in said case having an opening adjacent a wall beneath said overhang, said wall and said face of said ears oriented to come flush together when said tab is slid into said slot in said stored position.

9. The case of claim 1 wherein said tab includes at least two speakers thereon each of said speakers extending from said top surface of said tab.

10. The case of claim 9 wherein one of said at least two speakers is located closer to said distal end of said tab and one of said at least two speakers is located closer to said proximal end of said tab.

11. A method for amplifying sound from a smart device, including the steps of:
    identifying a smart device case with sound speaker having sides extending up from a floor to a rim, the case configured to hold a smart device therein with a front of the smart device surrounded by the rim, a slot in one of the sides, the slot closer to the floor than to the rim, a sound support tab having a width less than a width of the slot and a thickness less than a height of the slot, the tab having a proximal end opposite a distal end, the proximal end inside the slot, the distal end outside of the slot, the tab slidable between a stored position and a deployed position, with the deployed position locating the tab more out of the slot than the stored position and at least one speaker on the tab the speaker connectable to the smart device to output sound from the smart device through the speaker;
    placing a smart device inside the case;
    sliding the tab out of the slot sufficient to at least partially reveal the speaker; and
    passing a signal to the at least one speaker to cause the speaker to emit sound from the smart device.

12. The method of claim 11 including the further step of powering the speaker from a battery located on the tab and with a signal receiver on the tab;
    wirelessly transmitting a sound signal from the smart device to the signal receiver; and
    sending the signal from the signal receiver to the speaker with power from the battery to cause the speaker to emit sound correlating with the signal transmitted from the smart device.

13. The method of claim 11 including the further steps of:
    powering the speakers at least partially from a wire extending from said at least one speaker to the smart device; and
    sending a signal by wire from the smart device to the at least one speaker on the tab.

14. The method of claim 11 wherein said identifying step includes at least two speakers on the tab, the two speakers emitting left and right channels of a common sound signal.

15. The method of claim 11 including the further step of providing a pair of smart devices including a first smart device and a second smart device, each of the smart devices including a case from said providing step, each case having at least one speaker; and wirelessly interconnecting the at least one speaker of the case of the first smart device with the at least one speaker of the case of the second smart device, such that each of the speakers on each of the cases coupled to each of the pair of smart devices emits a sound representing at least a portion of a common sound signal.

16. The method of claim 15 wherein one of the at least two smart devices includes a sound signal source and a wireless transmitter; and each of the speakers associated with each of the cases coupled to the smart devices receives a signal from the transmitter directly from the smart device having the sound signal thereon.

17. The method of claim 16 wherein additional smartphones within additional cases having speakers therein establish a communications link with the smart device having the sound signal originating therefrom and such additional smart devices have at least a portion of the sound signal sent thereto to cause the speaker associated with the additional smart device to emit sound correlating with at least a portion of the sound signal.

18. The method of claim 15 including the further steps of:
sending a wireless sound signal from the first smart device to the second smart device; and
each smart device passing at least a portion of the sound signal to the speaker of the case in which each smart device is placed.

* * * * *